United States Patent Office.

CHARLES BOND, OF NEW YORK, N. Y.

Letters Patent No. 98,466, dated January 4, 1870.

IMPROVED COMPOSITION FOR DYEING AND COLORING LEATHER, HIDES, AND SKINS.

The Schedule referred to in these Letters Patent and making part of the same.

*To all whom it may concern:*

Be it known that I, CHARLES BOND, of New York, in the county of New York, and State of New York, have invented a new and useful Improvement in Dyeing and Coloring Leather, Hides, and Skins; and I do hereby declare that the following is a full and exact description thereof.

My invention consists in a new and useful bronze color or dye for leather, goat and other skins, morocco, and other similar materials.

To enable others skilled in the art to make and use my invention, I now proceed to describe the manner of making and using my color or dye.

In preparing my color or dye, I use the following substances or materials, to wit:

Aniline, one pound.
Alumina, one-fourth of a pound.
Gum-shellac, eight pounds.
Oxalic acid, one ounce.
Sulphuric ether, one pound.
Alcohol, three gallons.

Although not absolutely necessary, I usually pursue the following course in preparing the compound:

Mix the alcohol and sulphuric ether, and, in the mixture thus produced, dissolve the aniline, and afterward the oxalic acid, shellac, and alumina. Then agitate the vessel containing the compound, or gently stir the mixture, so as to thoroughly and uniformly mingle the materials. Now subject the compound to gentle heat during two to four hours, with continuous agitation or stirring.

By increasing the quantity of alumina, a deeper red color will be produced, and, by diminishing the quantity, a paler color will be obtained, and thus the desired shade may be secured.

The oxalic acid makes the color bright and clear, and the shellac, dissolved in the alcohol, gives body to the compound.

This coloring-compound may be applied to skins or leather with a fine brush or sponge.

I do not limit my invention to the precise quantities of the material above mentioned.

Having described my invention,

I claim the above-described coloring-compound for dressing or dyeing leather, skins, or hides, substantially as set forth.

CHARLES BOND.

Witnesses:
    E. P. BREED,
    G. L. SIMONSON.